United States Patent
Schmalz, Jr.

(10) Patent No.: US 11,068,380 B2
(45) Date of Patent: Jul. 20, 2021

(54) CAPTURING AND ENCODING OF NETWORK TRANSACTIONS FOR PLAYBACK IN A SIMULATION ENVIRONMENT

(71) Applicant: ServiceNow, Inc., Santa Clara, CA (US)

(72) Inventor: Ronald J. Schmalz, Jr., San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/058,099

(22) Filed: Aug. 8, 2018

(65) Prior Publication Data
US 2020/0050538 A1    Feb. 13, 2020

(51) Int. Cl.
*G06F 11/36* (2006.01)
*H04L 1/18* (2006.01)
*H04L 12/26* (2006.01)

(52) U.S. Cl.
CPC ...... *G06F 11/3664* (2013.01); *G06F 11/3672* (2013.01); *H04L 1/189* (2013.01); *H04L 43/022* (2013.01); *H04L 43/04* (2013.01)

(58) Field of Classification Search
CPC ....... G06F 11/36–3696; G06F 9/45558; G06F 2009/45562–45595; H04L 1/189; H04L 43/00–50; H04L 45/00–748; H04L 47/00–829
See application file for complete search history.

(56) References Cited

U.S. PATENT DOCUMENTS

| | | |
|---|---|---|
| 6,442,141 B1 | 8/2002 | Borella et al. |
| 6,678,887 B1 | 1/2004 | Hallman |
| 6,965,574 B1 | 11/2005 | Cook et al. |
| 7,020,706 B2 | 3/2006 | Cates |
| 7,653,006 B1 | 1/2010 | Marino et al. |

(Continued)

OTHER PUBLICATIONS

Mangharam, Rahul, et al. "GrooveSim: a topography-accurate simulator for geographic routing in vehicular networks." Proceedings of the 2nd ACM international workshop on Vehicular ad hoc networks. 2005. (Year: 2005).*

(Continued)

*Primary Examiner* — Doon Y Chow
*Assistant Examiner* — Joanne G Macasiano
(74) *Attorney, Agent, or Firm* — Fletcher Yoder PC

(57) ABSTRACT

A computing system may include a plurality of computational instances each containing one or more computing devices and one or more databases. A traffic filtering device may be configured to: receive a first sequence of packets and filter the first sequence of packets to create a second sequence of packets, where the second sequence of packets includes only copies of packets that were transmitted to a particular computational instance. The computing system may further include a simulation compiler device configured to: (i) receive the second sequence of packets, (ii) identify a captured transaction within the second sequence of packets, and (iii) encode the captured transaction as a playback instruction, where the playback instruction can be used to generate a third sequence of packets that, when transmitted to a computational instance used for testing, simulates the captured transaction.

18 Claims, 15 Drawing Sheets

(56) References Cited

U.S. PATENT DOCUMENTS

| | | | |
|---|---|---|---|
| 7,716,353 B2 | 5/2010 | Golovinsky | |
| 7,769,718 B2 | 8/2010 | Murley | |
| 7,925,981 B2 | 4/2011 | Pouheidari | |
| 8,402,127 B2 | 3/2013 | Solin | |
| 8,438,281 B2* | 5/2013 | Albert | H04L 12/14 709/226 |
| 8,612,408 B2 | 12/2013 | Trinon | |
| 8,971,196 B2* | 3/2015 | Degioanni | H04L 67/1097 370/252 |
| 9,098,322 B2 | 8/2015 | Apte | |
| 9,306,816 B2 | 4/2016 | Jana et al. | |
| 9,317,327 B2 | 4/2016 | Apte | |
| 9,363,252 B2 | 6/2016 | Mueller | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 9,916,225 B1 | 3/2018 | Bonczkowski et al. | |
| 9,932,652 B2 | 4/2018 | Sengoku et al. | |
| 2002/0065911 A1* | 5/2002 | von Klopp | H04L 43/045 709/224 |
| 2006/0013228 A1 | 1/2006 | Malloy et al. | |
| 2007/0011329 A1* | 1/2007 | Albert | H04L 12/14 709/226 |
| 2007/0106692 A1* | 5/2007 | Klein | G06F 16/954 |
| 2008/0097961 A1 | 4/2008 | Dias et al. | |
| 2010/0005097 A1 | 1/2010 | Liang et al. | |
| 2010/0195538 A1 | 8/2010 | Merkey et al. | |
| 2012/0005174 A1* | 1/2012 | Vora | G06F 11/3684 707/703 |
| 2012/0054245 A1 | 3/2012 | Colle et al. | |
| 2012/0084605 A1* | 4/2012 | Shilon | H04L 43/12 714/33 |
| 2012/0221519 A1 | 8/2012 | Papadomanolakis et al. | |
| 2013/0070622 A1* | 3/2013 | Degioanni | H04L 67/1097 370/252 |
| 2013/0094515 A1* | 4/2013 | Gura | H04L 63/123 370/419 |
| 2013/0194949 A1 | 8/2013 | Ruddick et al. | |
| 2014/0223418 A1 | 8/2014 | Michelsen et al. | |
| 2014/0237115 A1 | 8/2014 | Gaonkar et al. | |
| 2016/0028854 A1 | 1/2016 | Leeb et al. | |
| 2016/0301732 A1 | 10/2016 | Moretto et al. | |
| 2017/0012843 A1 | 1/2017 | Zaidi, III et al. | |
| 2017/0091809 A1* | 3/2017 | Liu | G06Q 30/0246 |
| 2017/0171044 A1* | 6/2017 | Das | H04L 43/08 |
| 2018/0150360 A1 | 5/2018 | Kwon et al. | |
| 2018/0316741 A1 | 11/2018 | Hassan et al. | |
| 2019/0026460 A1 | 1/2019 | Robertson et al. | |

OTHER PUBLICATIONS

Nivas, Tuli. "Test harness and script design principles for automated testing of non-GUI or web based applications." Proceedings of the First International Workshop on End-to-End Test Script Engineering. 2011. (Year: 2011).*

Anonymous: "Wireshark User's Guide", May 27, 2016 (XP055650803); retrieved from Internet URL/https://web.archive.org/web/20160527043947/https://www.wireshar.org.docs/wsug_html/.

Extended European Search Report for European Patent Application No. 19190693.2 dated Dec. 18, 2019; 12 pgs.

"BenchLab: An Open Testbed for Realistic Benchmarking of Web Applications", USENIX, The Advanced Computing Systems Association, May 5, 2011, pp. 1-12, XP061011495.

Extended European Search Report for European Patent Application No. 19190698.1 dated Feb. 4, 2020, 8 pgs.

* cited by examiner

```
POST /pub/WWW/ HTTP/1.1                                800
Host: www.example.org
Content-Length: 593

<?xml version=1.1 encoding=UTF-8?>
<request>
    <sc_xml_ver>1.1</sc_xml_ver>
    <pageURL>apps.example.com/summary.do</pageURL>
    <referrer>http://apps.example.com/summary.do</referrer>
    <ipAddress>192.168.10.1</ipAddress>
    <pageName>summary</pageName>
    <sessionID>14911</sessionID >
    <userAgent>Mozilla/4.0 (compatible; MSIE 7.0; Windows NT 6.0;
SLCC1; .NET CLR 2.0.50727; Media Center PC 5.0; .NET CLR 3.0.04506)</
userAgent>
        <userName>bobsmith@example.com</userName >
        <timestamp>2018-03-05 01:00:01</timestamp>
    </request>
```

FIG. 8

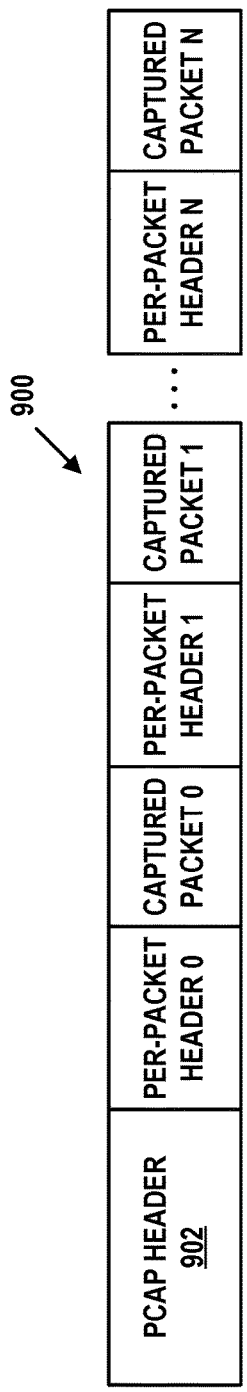
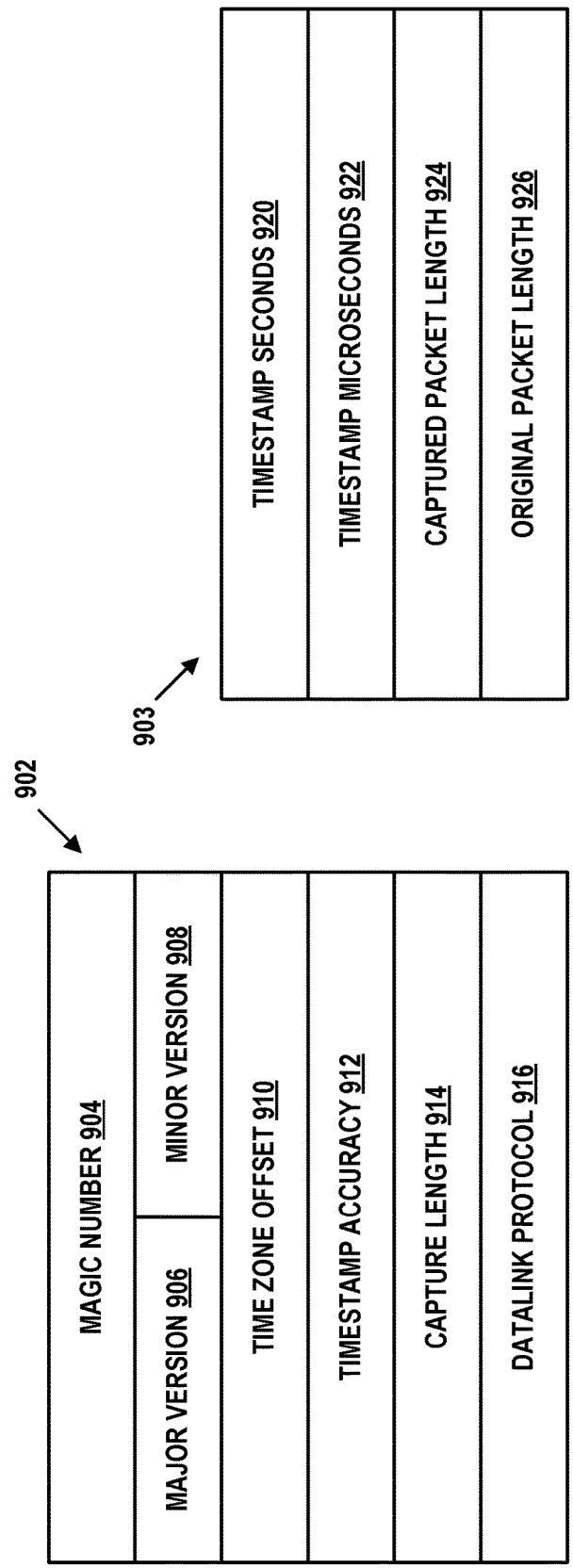

[ client IP address ] [ client name ] [ user name ] [ timestamp] [ payload ]

192.168.10.1 - bobsmith@example.com 2018-03-05 01:00:01 "POST /pub/WWW/ HTTP/1.1 ... </request>"

[ timestamp ] [ log level ] [ user name ] [sessionID] [ client IP address] [ payload ]

2018-03-05 01:00:01 info bobsmith@example.com 14911 192.168.10.1 "POST /pub/WWW/ HTTP/1.1 ... </request>"

CAPTURING AND ENCODING OF NETWORK TRANSACTIONS FOR PLAYBACK IN A SIMULATION ENVIRONMENT

BACKGROUND

Testing of networked software applications often relies on functionality and load testing. Functionality testing involves validation of the proper behavior of individual features or combinations of features. Load testing involves subjecting the application being tested to a sufficiently high number of transactions per unit time to validate that the application remains stable and meets performance requirements under this load. Nonetheless, conventional functionality and load testing can fail to fully exercise all pathways of the application, and may not accurately represent the character and volume of load that is presented to the application during actual operation in production.

SUMMARY

The embodiments herein involve recording, by a simulation compiler and/or related devices, samples of actual, live network traffic transmitted to a software application in a production environment. This recording may be non-intrusive so that the performance of the software application is not adversely impacted. The recording may last anywhere from several seconds to several days (or more), and may be compressed and encoded into representations of transactions. Then, at a later point in time, a load generator may decode the representations and generate network traffic that is used to test a version of the software application in a non-production (testing) environment.

In this way, the software application is tested with a realistic collection of real-world transactions that provides a meaningfully representative load against the system under test. Furthermore, any behavioral anomalies (such as performance degradations, functionality failures, or crashes), which occurred during the recording phase can be reproduced in the non-production environment. As a result, the software application can be more thoroughly tested than it otherwise would be from conventional techniques. Furthermore, subtle defects that would normally only present themselves in the production environment can be reproduced as needed, debugged, and corrected.

Accordingly, a first example embodiment may involve a computing system configured to operate as a remote network management platform. The computing system may include a plurality of computational instances each containing one or more computing devices and one or more databases. The computing system may further include a load balancer device configured to (i) receive incoming network traffic addressed to the computational instances, and (ii) distribute the incoming network traffic to the computational instances, where the distribution across the one or more computing devices of each computational instance is in accordance with a load balancing algorithm. The computing system may further include a traffic filtering device, coupled to the load balancer device, configured to: (i) receive, as a first sequence of packets, copies of the incoming network traffic from the load balancer device, and (ii) filter the first sequence of packets to create a second sequence of packets, where the second sequence of packets includes only copies of packets that were transmitted to a particular computational instance of the plurality of computational instances. The computing system may further include a storage device, coupled to the traffic filtering device, configured to receive the second sequence of packets from the traffic filtering device and store the second sequence of packets. The computing system may further include a simulation compiler device, coupled to the storage device, configured to: (i) receive the second sequence of packets from the storage device, (ii) identify a captured transaction within the second sequence of packets, and (iii) encode the captured transaction as a playback instruction, where the playback instruction can be used to generate a third sequence of packets that, when transmitted to a computational instance used for testing, simulates the captured transaction.

A second example embodiment may involve receiving, by a simulation compiler device, a sequence of packets, where the sequence of packets was transmitted to one or more computing devices and represent one or more captured transactions that took place involving the one or more computing devices, where the one or more computing devices are part of a computational instance that also contains one or more databases, and where the simulation compiler device is communicatively coupled to the one or more computing devices. The second example embodiment may further involve identifying, by the simulation compiler device, a captured transaction within the sequence of packets. The second example embodiment may further involve encoding, by the simulation compiler device, the captured transaction as a playback instruction, where the playback instruction can be used to generate a further sequence of packets that, when transmitted to a computational instance used for testing, simulates the captured transaction.

A third example embodiment may involve a simulation controller device configured to store playback instructions. The playback instructions may encode corresponding transactions that were captured in a computational instance deployed in a production environment. The third example embodiment may further involve one or more load generator devices, coupled to the simulation controller device, configured to: (i) receive a playback instruction from the simulation controller device, and (ii) decode the playback instruction into a sequence of packets. The playback instruction may be from the stored playback instructions. The third example embodiment may further involve one or more computing devices, coupled to the one or more load generator devices, configured to: (i) receive the sequence of packets from the one or more load generator devices, and (ii) based on processing the sequence of packets, simulate a captured transaction corresponding to the playback instruction. The third example embodiment may further involve one or more database devices, coupled to the one or more computing devices, configured to: (i) replicate a configuration and stored content of a database from the computational instance deployed in the production environment, and (ii) provide parts of the stored content requested by the one or more computing devices during the simulated transaction.

A fourth example embodiment may involve receiving, by a load generator of a computing system arranged to simulate a computational instance in a production environment, a playback instruction that represents a captured transaction that occurred in the computational instance. The fourth example embodiment may further involve, possibly in response to receiving the playback instruction, (i) decoding, by the load generator, the playback instruction into a sequence of packets, and (ii) transmitting, by the load generator, the sequence of packets. The fourth example embodiment may further involve receiving, by a computing device of the computing system, the sequence of packets. The fourth example embodiment may further involve, possibly based on processing the sequence of packets, simulating, by the computing device, a transaction that simulates the captured transaction corresponding to the playback instruction. The computing device, during the simulated transaction, may request and receive data from a database device of the computing system. The database device may be configured to replicate a configuration and stored content of a database from the computational instance.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system may include various means for carrying out each of the operations of the first, second, third, and/or fourth example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts a sample HTTP request, in accordance with example embodiments.

FIG. 9A depicts a sequence of captured packets, in accordance with example embodiments.

FIG. 9B depicts an overall header for a sequence of captured packets, in accordance with example embodiments.

FIG. 9C depicts a per-packet header for a sequence of captured packets, in accordance with example embodiments.

DETAILED DESCRIPTION

Figure 1:
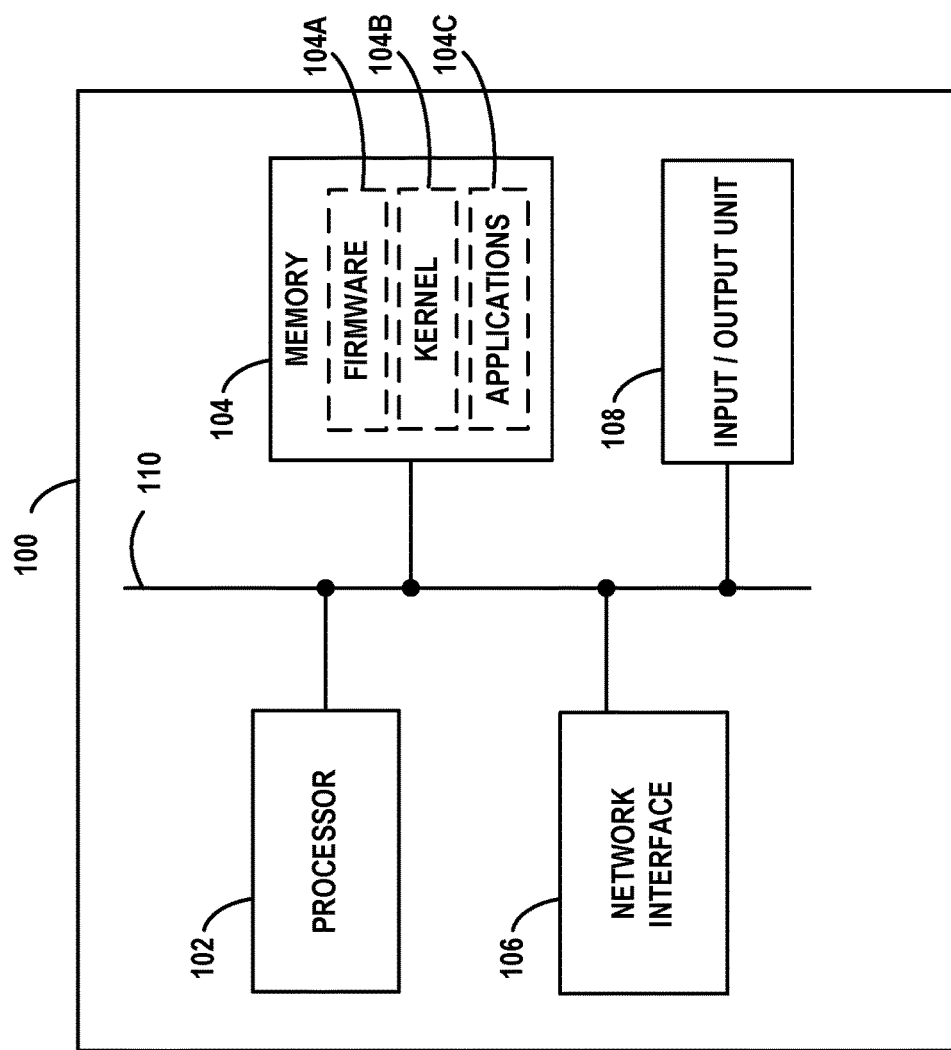
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
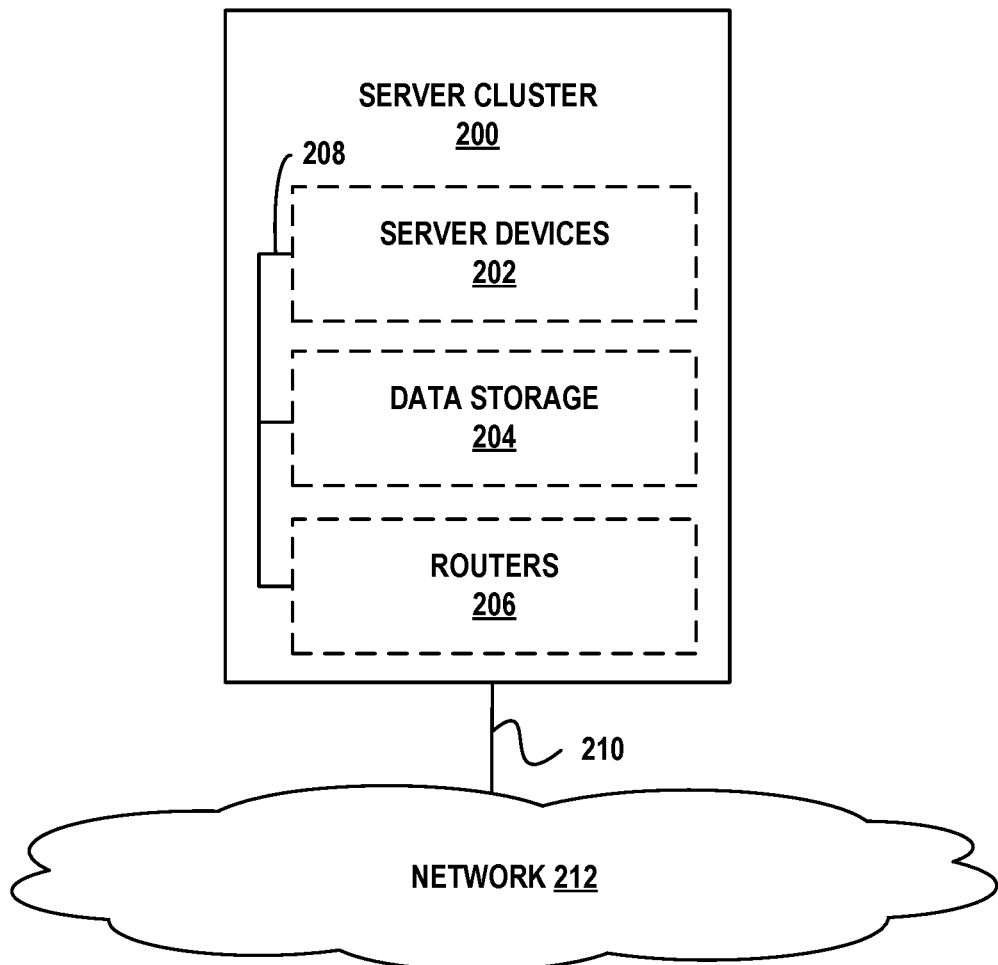
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
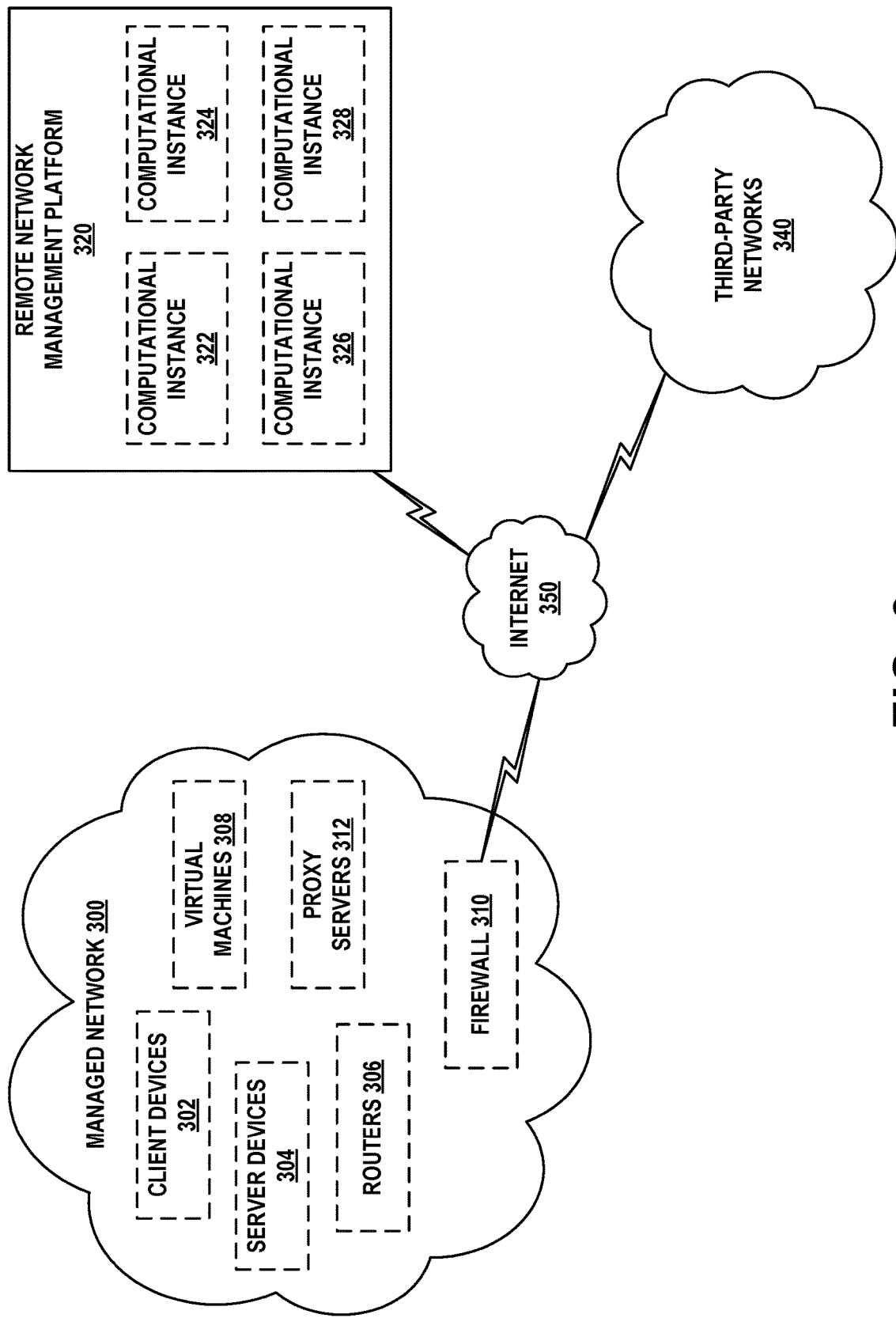
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
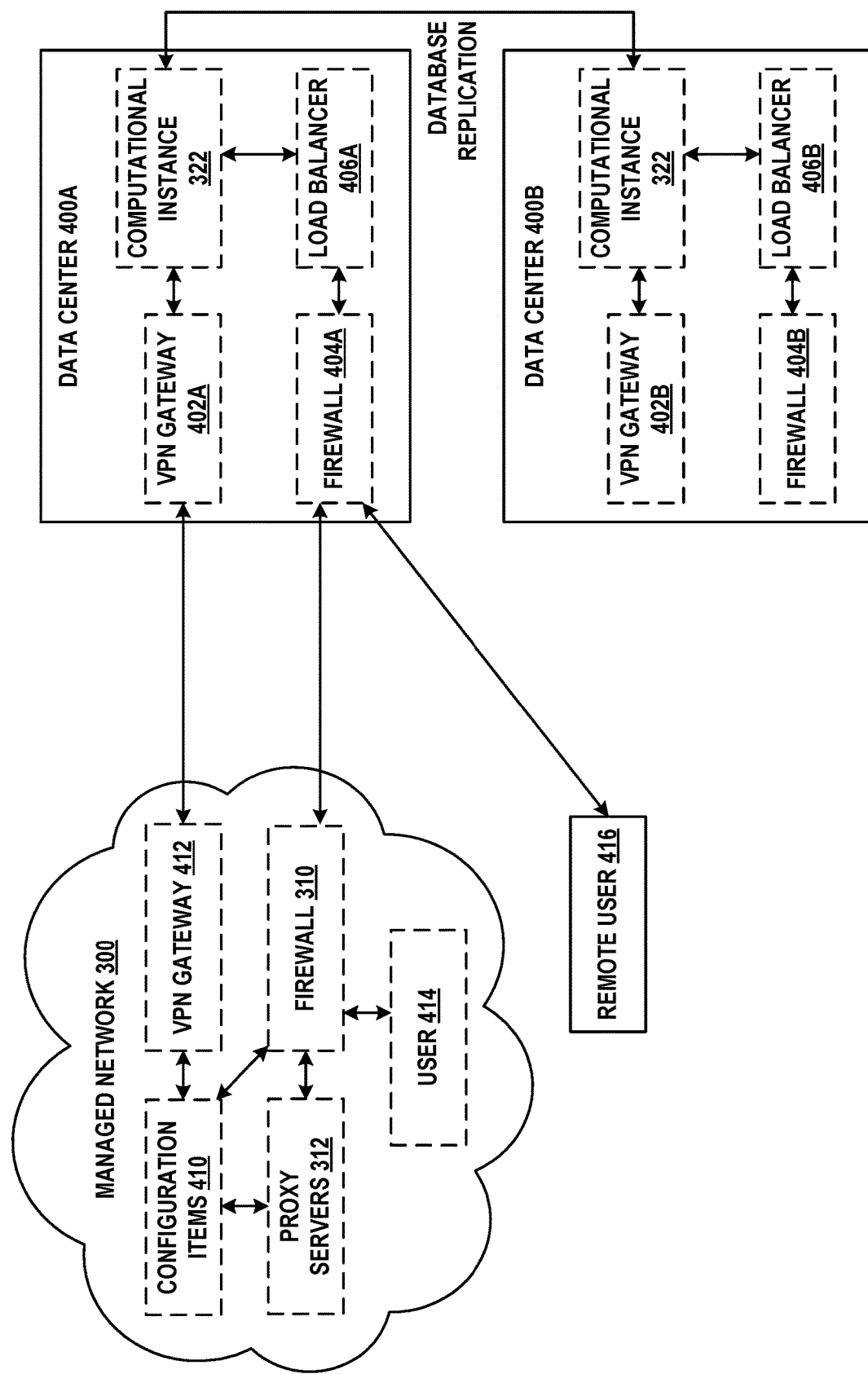
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
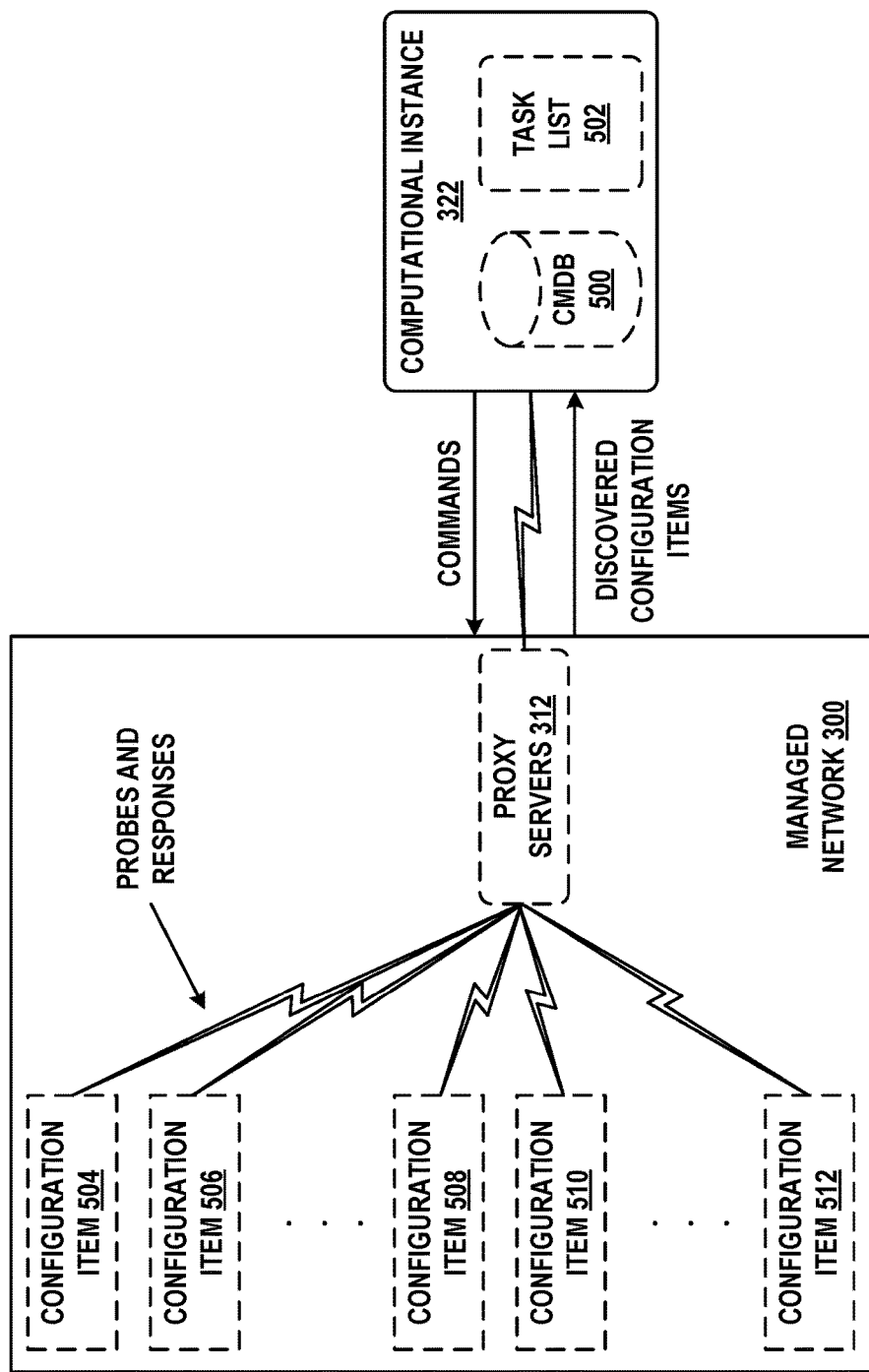
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
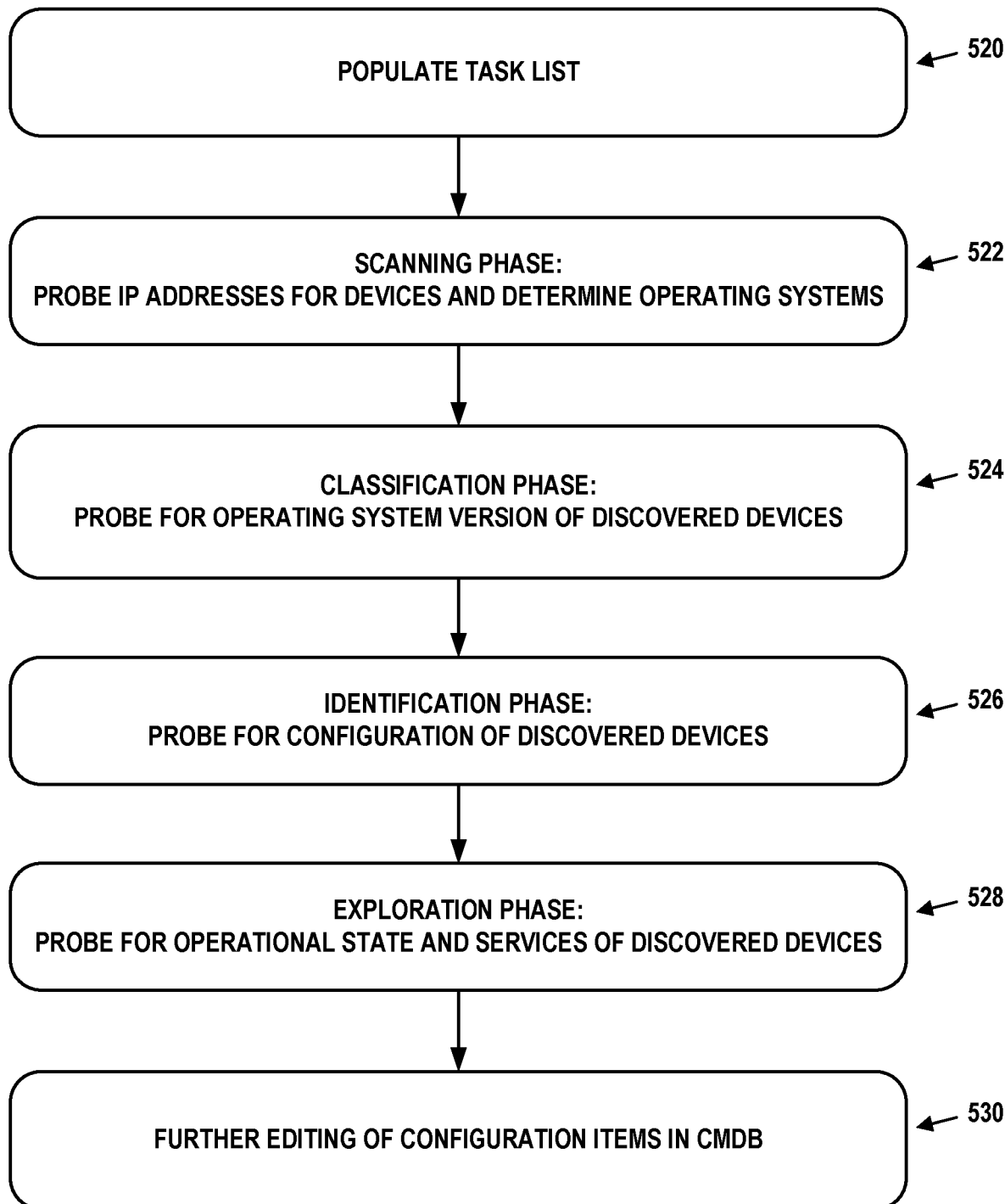
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. TRANSACTION RECORDING ARCHITECTURE

Figure 6A:
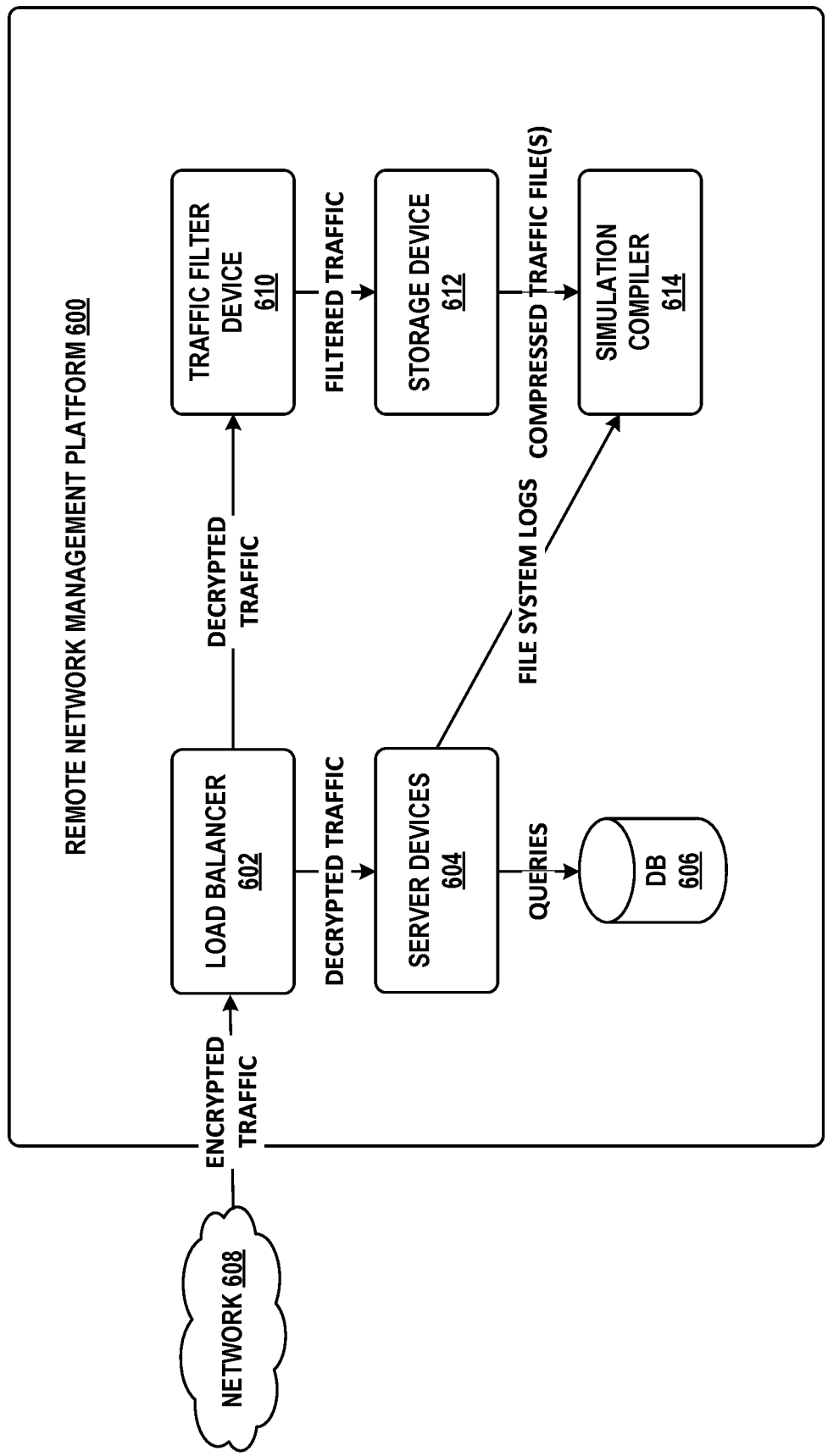
FIG. 6A depicts a production environment that collects representations of transactions, in accordance with example embodiments.

FIG. 6A depicts a logical arrangement of devices for recording network transactions in a production instance of a remote network management platform. Herein, the term "production instance" may refer to a computational instance that is being used in a production (live) environment to serve user requests from customers of the remote network management platform. In contrast, a "testing instance" may be used for testing of the software application(s) that make up the remote network management platform. The testing instance may be a non-production environment.

Remote network management platform 600 may include production instances dedicated to one or more particular enterprises, as embodied by server devices 604 and databases 606. Thus, server devices 604 and databases 606 may be divided into multiple computational instances, each dedicated to a managed network. Any particular computational instance may include one or more dedicated server devices of server devices 604 and one or more dedicated databases of databases 606.

Operationally, load balancer 602 may receive encrypted network traffic, in the form of packets, from network 608. Load balancer 602 may serve as the endpoint for this encryption. For instance, the encrypted network traffic may include Secure Hypertext Transfer Protocol (HTTPS) traffic between a web client and a web service operated by a computational instance operating on one or more of server devices 604. Load balancer 602 may be assigned an IP address associated with this web service (e.g., a virtual IP address). But rather than providing the web service, load balancer 602 may instead decrypt the HTTPS traffic and transmit this decrypted traffic to server devices 604. In doing so, load balancer 602 may select one of server devices 604 of the target computational instance based on load reported by these server devices, based on a round-robin algorithm, randomly, or according to some other mechanism. Regardless of the exact selection technique that is employed, load balancer 602 may attempt to distribute incoming traffic across server devices 604 so that no one of these server devices is significantly more loaded than any other.

Once one of server devices 604 receives the decrypted traffic, this server device may carry out processing of the traffic. For instance, the server device may determine that the traffic requests delivery of a particular web page. In order to generate this web page, the server device may make one or more queries to databases 606. Particularly, the server device selects a database from those available to the computational instance, and transmits the queries to this database.

Though not shown in FIG. 6A (because the architecture depicted is focused on incoming traffic), the server device may collate the responses from these queries into a representation of a web page, and transmit this representation as network traffic (e.g., packets) to the load balancer 602. Load balancer 602 may encrypt this network traffic in accordance with HTTPS, and transmit the encrypted network traffic to the sender.

Figure 6B:
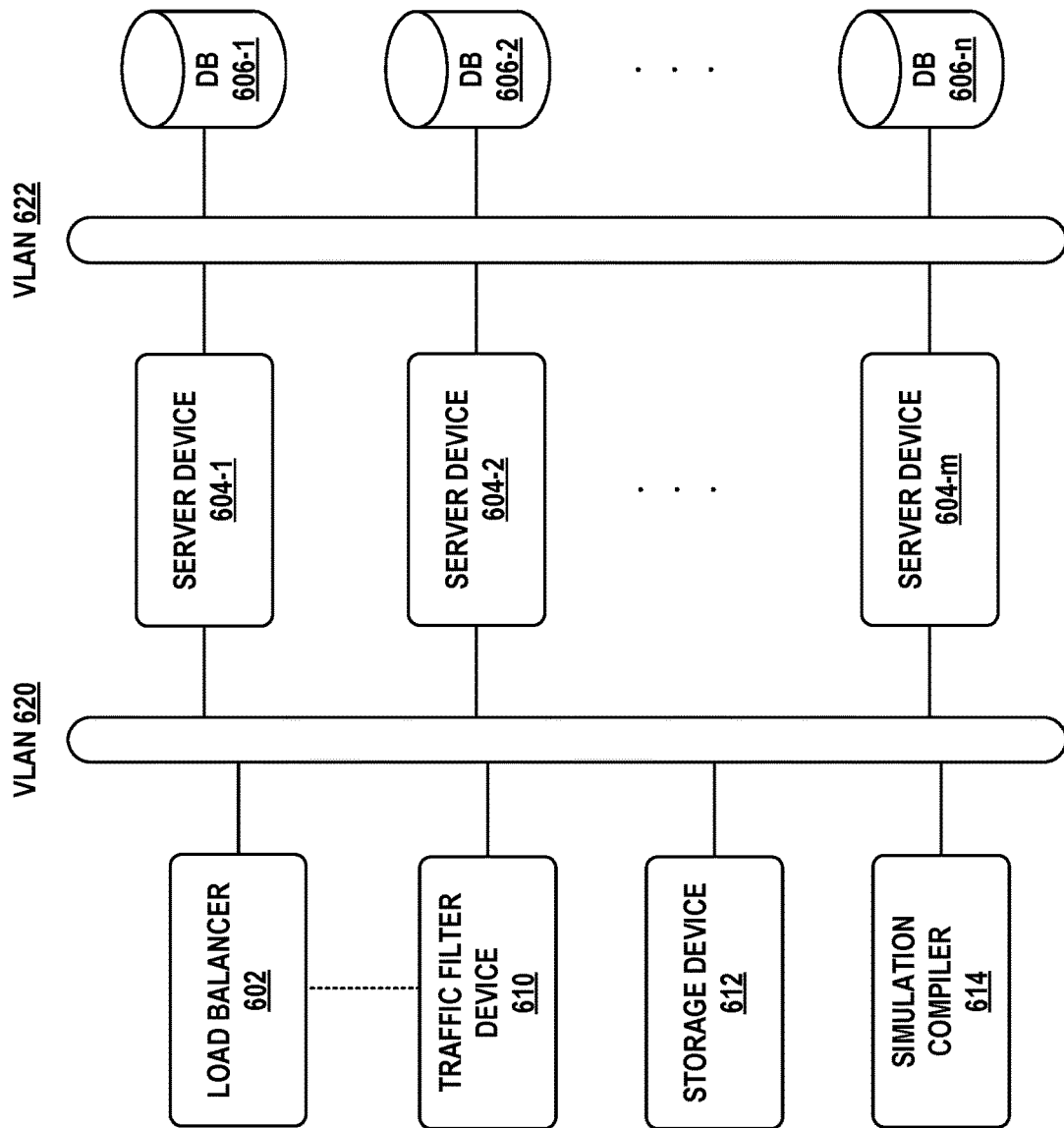
FIG. 6B depicts a network configuration that supports the arrangement of FIG. 6A, in accordance with example embodiments.

Another view of a production instance is shown in FIG. 6B. Therein, load balancer 602 distributes incoming traffic, by way of virtual local area network (VLAN) 620, to m server devices 604-1, 604-2, . . . , 604-m of the production instance. These server devices access, by way of VLAN 622, one or more of n databases 606-1, 606-2, . . . , 606-n. Traffic filter device 610 may be communicatively coupled to load balancer 602, either by way of VLAN 620 (solid line) or directly (dotted line). Storage device 612 and simulation compiler 614 may also communicate by way of VLAN 620. Other arrangements of LANS, VLANs, and/or direct connections are possible.

In this context, a VLAN is partitioned and isolated from other VLANs at the data link layer level. Thus, for example, a single physical Ethernet LAN may be partitioned into multiple logical VLANs that are separate from one another. Each VLAN may be associated with a tag that is attached (e.g., prepended) to each packet thereon so that the VLAN to which each packet belongs can be unambiguously determined.

Turning back to FIG. 6A, traffic filter device 610 may be coupled to a port of load balancer 602 in order to record the incoming network traffic. Load balancer 602 may be arranged to transmit a copy of (e.g., mirror) the decrypted traffic from this port as well. Alternatively, traffic filter device 610 may be arranged to tap into a communication link between load balancer 602 and server devices 604. In any event, a copy of the decrypted incoming traffic is made available to traffic filter device 610.

Traffic filter device 610 may be a network appliance or other device that can receive and capture a stream of packets, and apply a filter to these packets either during or after reception. For instance, traffic filter device 610 may receive the packets and store them in PCAP format. This particular format for storing captured packets is illustrated in FIGS. 9A, 9B, and 9C. Nonetheless, other packet storage formats may be used.

Traffic filter device 610 may also filter the incoming packets so that only packets that are likely to be of interest are stored. Filters can be applied to the packets based on their source IP address, destination IP address, source port number, destination port number, or any other information in the headers or payload of a packet. In order to capture incoming packets that are bound for a particular computational instance, a filter expression including a logical "or" operation over all IP addresses of those of server device 604 that are within the computational instance may be applied. For example, if a particular computational instance includes server devices assigned IP addresses of 192.168.0.10, 192.168.0.11, and 192.168.0.12, a logical "or" expression "192.168.0.10 OR 192.168.0.11 OR 192.168.0.12" may be used to capture packets being transmitted only to the particular computational instance.

Storage device 612 may be used to store the packets filtered by traffic filter device 610. Alternatively, the operations of traffic filter device 610 and storage device 612 may be combined into a single physical device or further divided amongst more than two physical devices. Regardless, storage device 612 may store the packets in non-volatile memory, such as on a solid-state drive, hard disk drive, or analogous storage medium. In order to conserve storage, traffic filter device 610 and/or storage device 612 may compress the packets prior to storage in storage device 612.

Simulation compiler 614 may gather or be provided with information from storage device 612 and server devices 604. As noted, simulation compiler 614 may receive copies of captured packets. Server devices 604 may store records of transactions in file system logs, and provide copies of these file system logs, periodically or on demand, to simulation compiler 614.

While the network traffic collected by simulation compiler 614 is in the form of packets, the file system logs represent entire transactions at a higher level. For instance, an HTTP POST command received by server devices 604 may be represented in one or more packets. These packets are ultimately stored in storage device 612 and then can be provided to simulation compiler 614 as a file containing these packets. In contrast, server devices 612 may record a representation of the command as an entry in a log file. This entry may contain information stating that a transaction involved an HTTP POST command, as well as the parameters and body of the command. This representation may also be provided to simulation compiler 614.

The recorded packet representations may include information that is omitted from the file system logs. For example, the file system logs may record only a single HTTP command per transaction, thus omitting any additional HTTP commands transmitted according to AJAX or a similar protocol. On the other hand, the file system logs may capture information related to transactions that are not observable to traffic filter device 610. For instance, transactions between various applications executing on one of server devices 604 may utilize a loopback mechanism so that the packets from these transactions never leave that server device—instead, the packets are internally routed from application to application by the networking stack.

Thus, recording both high-fidelity data (packets) and low-fidelity data (file system logs) results in none or few transactions being missed or failing to be recorded. Since there may be overlap between these data (e.g., some transactions will be represented in both the high-fidelity data and low-fidelity data), simulation compiler 614 can de-duplicate the data by transaction type (e.g., HTTP POST, HTTP GET, HTTP HEAD, etc.) and timestamp, for example, so that each trace contains only one copy of each transaction. Recordings of high-fidelity data and/or low-fidelity data may be referred to herein as traces. More detail on the format of the high-fidelity data and low-fidelity data is provided below.

Although not shown in FIG. 6A, databases 606 may store images (snapshots) of the tables, fields, and other arrangements therein, as well as transaction logs that record changes to these tables, fields, and other arrangements. Databases 606 may copies of the images and transaction logs, periodically or on demand, to simulation compiler 614 or other components.

VI. TRANSACTION PLAYBACK ARCHITECTURE

Figure 7A:
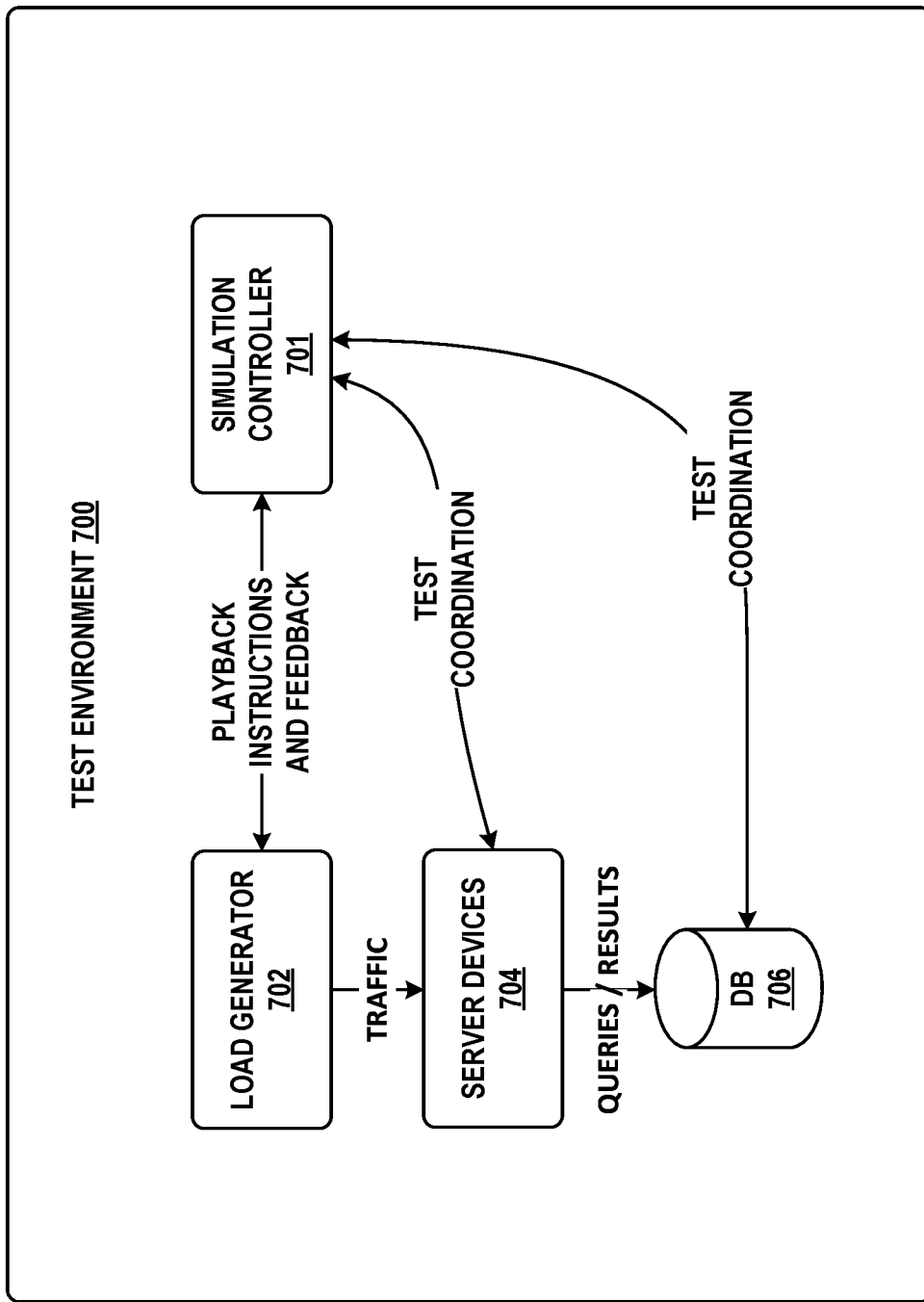
FIG. 7A depicts a testing environment that supports playback of collected transactions, in accordance with example embodiments.

FIG. 7A depicts a logical arrangement of devices for playing back recorded transactions in a testing instance of a remote network management platform. While a single unit representing each of simulation controller 701, load generator 702, server devices 704, and databases 706 is shown in this figure, in practice multiple physical or logical units or devices may be used for any of these components. Furthermore, simulation controller 701 may be the same device that collects traces from a production instance (e.g., simulation compiler 614), or may be a different device.

A goal of this arrangement is to be able to accurately recreate, in a testing instance, a copy of a production instance as it was at a particular point in time. For example, the testing instance may be designed with the same number and layout of server devices 604 and databases 606. The databases in the testing instance may be loaded with a stored image of the production instance's database, and this image may be played forward with stored database transaction logs to a particular point in time.

As noted above, simulation compiler 614 may be provided with one or more of the compressed traffic files and/or file system logs starting at the particular point in time. From these, simulation compiler 614 may create a series of playback instructions that can be used to generate transactions that replicate those that were recorded by traffic filter device 610 and server devices 604.

Doing so provides a much more accurate way of testing remote network management platform 600. Particularly, the use of real network traffic and the associated transactions against a replica of a production instance may allow for isolation of performance problems and other software defects that cannot be found through conventional regression and load testing.

As an example, the arrangement of FIG. 6A may be used to collect a week's worth of traffic and transactions from a production instance. Suppose that, during this week, the production instance suffered from poor performance during a particular hour. The configuration and environment of the production instance may be replicated in a testing instance. The database of the testing instance may be restored from an image of the database of the production instance, and played forward to around the beginning of when the poor performance began. Then, the compressed traffic files and file system logs from this point and time may be used to create a series of transactions that can further serve as the basis for traffic to be transmitted to the testing instance. The operation of the testing instance can be monitored in real time and it may be possible to determine the cause of the poor performance.

Thus, simulation controller 701 has access to traces representing transactions. As noted above, these traces may have been collected from network traffic (packets) transmitted to server devices of a production instance, as well as file system logs of the production instance.

These traces are provided to load generator 702 in the form of playback instructions. Each such instruction causes load generator 702 to generate one or more packets with a command, parameters, and/or payload specified by the trace.

Load generator 702 may, in turn, transmits these packets as network traffic to server devices 704. As part of carrying out these resulting transactions, server devices 704 may access databases 706.

Figure 7B:
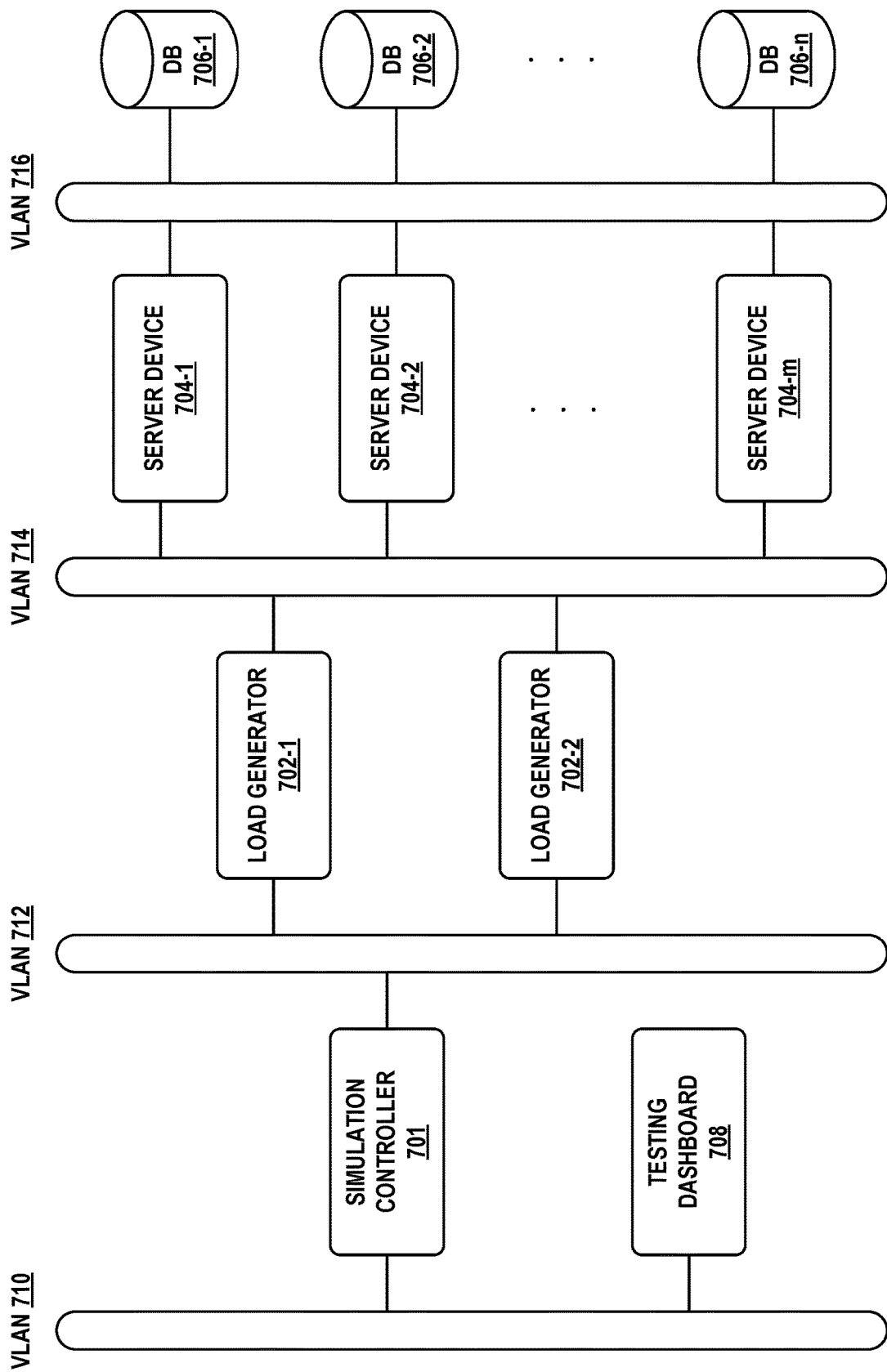
FIG. 7B depicts a network configuration that supports the arrangement of FIG. 7A, in accordance with example embodiments.

Another view of a testing instance is shown in FIG. 7B. Therein, VLAN 714, m server devices 704-1, 704-2, . . . , 704-*m*, VLAN 716, and n databases 706-1, 706-2, . . . , 706-*n* replicate VLAN 620, m server devices 604-1, 604-2, . . . , 604-*m*, VLAN 622, and n databases 606-1, 606-2, . . . , 606-*n* of the production instance. Load generators 702-1 and 702-2 also connect to VLAN 714 may be used to produce and send packets to server devices 704-1, 704-2, . . . , 704-*m*. Simulation controller 701 may be communicatively coupled to load generators 702-1 and 702-2 by way of VLAN 712. Simulation controller 701 may provide playback instructions to load generators 702-1 and 702-2.

Testing dashboard 708 may be communicatively coupled to simulation controller 701 by way of VLAN 710. Testing dashboard 708 may provide a graphical user interface through which a user can manipulate simulation controller 701. For example, the user may be able to view a list of available traces, select a trace for playback, begin playback of the trace, end playback of a selected trace, delete a trace, and so on. Testing dashboard 708 may also provide feedback regarding progress of any ongoing trace playback, and/or results of a played back trace.

The arrangement of FIG. 7B may be designed so that it produces little or no outbound traffic. In this way, the testing instance is unlikely to disrupt nearby production or testing instances.

VII. DATA FORMATS AND PROCESSING

As discussed above, simulation compiler 614 may receive input from storage device 612 (in the form of one or more files of compressed network traffic) and server devices 604 (in the form of file system logs). Simulation compiler 614 may correlate and cross-reference the transactions represented by this input, and encode a combined representation of the total transactions experienced by server devices 604. This combined representation may be a series of instructions that can be used to simulate the traffic from network 608 that was presented to server devices 604.

A. HTTP Request Format

The protocol of primary interest in a remote network management platform described herein is HTTP, as most client/server exchanges facilitated by the remote network management platform are web-based. HTTP transactions may consist of one or more requests and responses. HTTP traffic that is incoming to the remote network management platform may primarily or exclusively be requests.

HTTP requests have three main parameters: command, headers, and body. In general, a command (also referred to as a method) is defined at the beginning of the request, followed by one or more headers, followed by the body. A sample HTTP request 800 is shown in FIG. 8.

HTTP commands describe the type of request and may include, for example, GET (requests data from a specified resource), POST (provides data to be processed to a resource), HEAD (similar to GET but returns only HTTP headers and no HTTP body), PUT (provides a representation of the specified resource), DELETE (deletes the specified resource), OPTIONS (requests a list of HTTP commands that the server device supports), and CONNECT (converts the request connection to a TCP/IP tunnel). Each of the "resources" described above may be an application or software module associated with a particular uniform resource locator (URL). In some embodiments, AJAX transactions by way of representational state transfer (REST) or simple object access protocol (SOAP) may use different or arbitrary HTTP commands.

In sample HTTP request 800, the command type is POST. This command is encoded in the first line of the HTTP request, which is also referred to as the command line.

HTTP headers allow further information to be provided with a request. The format of these headers is a header name, followed by a colon, followed by a value associated with the header name. For instance, in sample HTTP request 800, the "Host" header has a value of "www.example.org" and the "Content-Length" header has a value of "593".

An HTTP body (which may or may not be present in any particular HTTP request) includes data bytes encoding the details of the request. As examples, an HTTP body may include text, XML-encoded data, JSON-encoded data, or URL-encoded data. The body of sample HTTP request 800 includes XML-encoded data. This encoding is specified by the first line of the body (<?xml version=1.1 encoding=UTF-8?>). The body continues until the end of the HTTP request.

When the original data to be transmitted includes non-printable and/or non-ASCII characters, URL-encoding may be used to replace each such character with an escape code representing that character. For example, the URL-encoding of the text string "Hello World" may be "Hello+W % C3% B6rld".

Notably, the full URL of the request can be derived from the value of the "Host" header as well as the string immediately following the command declaration in the command line. Thus, in sample HTTP request 800, the URL is "www.example.org/pub/WWW/".

B. High-Fidelity (Network Traffic) Traces

Incoming packets to traffic filter device 610 can be stored in several possible formats as traces. One such format is the PCAP (packet capture) format, illustrated in FIG. 9A. File 900 represents a series of N+1 captured packets in the PCAP format, stored in order of the time they were captured. PCAP header 902 is a data structure defined in FIG. 9B. Each of the N+1 captured packets may be preceded by a per-packet header. An example per-packet header 903 is shown in FIG. 9C. File 900 may be a binary file that can be stored within short-term storage (e.g., main memory) or long-term storage (e.g., a disk drive) of traffic filter device 610.

As noted above, FIG. 9B illustrates the contents of PCAP header 902. There may be one instance of PCAP header 902 disposed at the beginning file 900.

Magic number 904 may be a pre-defined marker of the beginning of a file with PCAP header 902, and serves to indicate the byte-ordering of the computing device that performed the capture. For instance, magic number 904 may be defined to always have the hexadecimal value of 0xa1b2c3d4 in the native byte ordering of the capturing device. If the device that reads file 900 finds magic number 904 to have this value, then the byte-ordering of this device and the capturing device is the same. If the device that reads file 900 finds magic number 904 to have a value of 0xd4c3b2a1, then this device may have to swap the byte-ordering of the fields that follow magic number 904.

Major version 906 and minor version 908 may define the version of the PCAP format used in file 900. In most instances, major version 906 is 2 and minor version 908 is 4, which indicates that the version number is 2.4.

Time zone offset 910 may specify the difference, in seconds, between the local time zone of the capturing device and Coordinated Universal Time (UTC). In some cases, the capturing device will set this field to 0 regardless of its local time zone.

Timestamp accuracy 912 may specify the accuracy of any time stamps in file 900. In practice, this field is often set to 0.

Capture length 914 may specify the maximum packet size, in bytes, that can be captured. In some embodiments, this value is set to 65536, but can be set to be smaller if the user is not interested in large-payload packets, for instance. If a packet larger than what is specified in this field is captured, it may be truncated to conform to the maximum packet size.

Datalink protocol 916 may specify the type of datalink interface on which the capture took place. For instance, this field may have a value of 1 for Ethernet, 105 for Wifi, and so on.

FIG. 9C illustrates the contents of per-packet header 903. As shown in FIG. 9A, there may be one instance of per-packet header 903 for each packet represented in file 900. Each instance of per-packet header 903 may precede its associated packet.

Timestamp seconds 920 and timestamp microseconds 922 may represent the time at which the associated packet was captured. As noted above, this may be the local time of the capturing device or UTC time.

Captured packet length 924 may specify the number of bytes of packet data actually captured and saved in file 900. Original packet length 926 may specify the number of bytes in the packet as the packet appeared on the network on which it was captured.

In general, captured packet length 924 is expected to be less than or equal to original packet length 926. For example, if capture length 914 is 1000 bytes and a packet is 500 bytes, then captured packet length 924 and original packet length 926 may both be 500. However, if the packet is 1500 bytes, then captured packet length 924 may be 1000 while original packet length 926 may be 1500.

Regardless of exact arrangement, the PCAP format (or any other comparable packet capture format) can be used to encode a sequence of one or more packets in a file. Such a file can be provided to simulation controller 701 for playback to a testing instance.

C. Encoding Playback Commands from High-Fidelity Traces

From the encoded packets in a high-fidelity trace, individual transactions may be detected. These transactions may be encoded into playback commands.

For example, the start of a TCP transaction may be detected by a TCP packet with the SYN flag set, and the end of a TCP transaction may be detect by a TCP packet with the FIN flag set. All TCP packets that are part of this transaction will have a timestamp between that of the TCP packet with the SYN flag set and the TCP packet with the FIN flag set, and will also have the same source IP addresses, destination IP addresses, source TCP port numbers, and destination TCP port numbers. Thus, all packets from a particular transaction and their ordering in time can be unambiguously identified. The payloads of these packets may be combined according to their ordering to determine the entire data transmitted from a client device to server devices 604.

As noted above, the main protocol of interest in the remote network management platform described herein is HTTP. Each HTTP transaction may be represented as a 7-entry vector of HTTP-related fields: (timestamp, session, username, HTTP command, URL, HTTP headers, HTTP body). Nonetheless, HTTP transactions may be encoded differently (such as with more or fewer fields), as may non-HTTP transactions.

The timestamp field of a transaction may be the time at which the first packet of the transaction was received by traffic filter device 610 or storage device 612. This timestamp may be derived from fields 920 and/or 922 of the packet's per-packet PCAP header (see FIG. 9C).

The session field of a transaction may be a marker (e.g., a number, alphanumeric, or binary code) that uniquely identifies the transaction in space and time. For instance, a client device may use a particular marker or combination of markers in the payload of packets to identify the transaction.

The username field of a transaction may refer to a user for whom the transaction is carried out. For instance, the user may be logged into server devices 604, and the user's name or identifier may appear in the payload of the transaction.

The HTTP command field for the transaction may identify any one of the HTTP commands described above (e.g., GET, POST, HEAD, PUT, DELETE, OPTIONS, or CONNECT), or any other HTTP command.

The URL field for the transaction may be the URL to which the HTTP request was sent. As noted above, this URL can be derived from the text immediately following the HTTP command type and the value of the "Host" header.

The HTTP header field for the transaction may include all HTTP headers and their associated values as appearing in the HTTP request. Similarly, the HTTP body field for the transaction may include the HTTP body appearing in the HTTP request.

Given these definitions, the 7-entry vector for sample HTTP request 800 may take the form shown in the table below:

TABLE 1

Encoding of an HTTP transaction from a high-fidelity trace.

| Entry | Value |
| --- | --- |
| Timestamp | 2018-03-05 01:00:01 |
| Session | 14911 |
| User name | bobsmith@example.com |
| HTTP command | POST |
| URL | www.example.org/pub/WWW/ |
| HTTP headers | Host: www.example.org Content-Length: 593 |
| HTTP body | <?xml version=1.1 encoding=UTF-8?> ... </request> |

Note that it is assumed that the timestamp that appears in the HTTP body is identical to the timestamp that appears in the appropriate per-packet PCAP header(s). In practice, this might not always be the case. Also, the HTTP body is abbreviated for convenience, as indicated by the ellipsis. In practice, the entire HTTP body may be present in the vector.

Once one or more transactions are encoded in this fashion, they may be stored (e.g., in a file) for later playback in a simulation environment.

D. Low-Fidelity (Log) Traces

As noted above, server devices 604 may record representations of transactions in log files. For example, applications (e.g., web server applications) processing the transactions may have dedicated log files to which these applications write the representations of each transaction. Alternatively or additionally, the applications processing the transactions may use a common log file format, such as syslog format. While these log files, also referred to a file system logs, may take on various formats and these formats may be user-customized, two possibilities are shown in FIGS. 10A and 10B for sample HTTP request 800 of FIG. 8.

Figure 10A:
FIG. 10A depicts a file system log format and example log entry, in accordance with example embodiments.

Format 1000 of FIG. 10A shows an example log format. This format includes the client IP address (e.g., the IP address of the device initiating the transaction), the client name, if applicable (e.g., found through a reverse DNS lookup of the client IP address), a user name associated with the transaction, a timestamp of the transaction, and a payload of the transaction.

Example log entry 1002 shows how a log entry for sample HTTP request 800 might appear according to this format. The client IP address is 192.168.10.1 (read from the source IP address of incoming packets of the transaction), the client name is undefined (e.g., the reverse DNS lookup of 192.168.10.1 did not return an name), the user name is bobsmith@example.com (e.g., provided from the context of the transaction), the timestamp is 2018-03-05 01:00:01 (e.g., the time at which a packet of the transaction arrived at server devices 604), and the payload is "POST/pub/WWW/HTTP/1.1 . . . </request>". The payload may be URL-encoded.

Figure 10B:
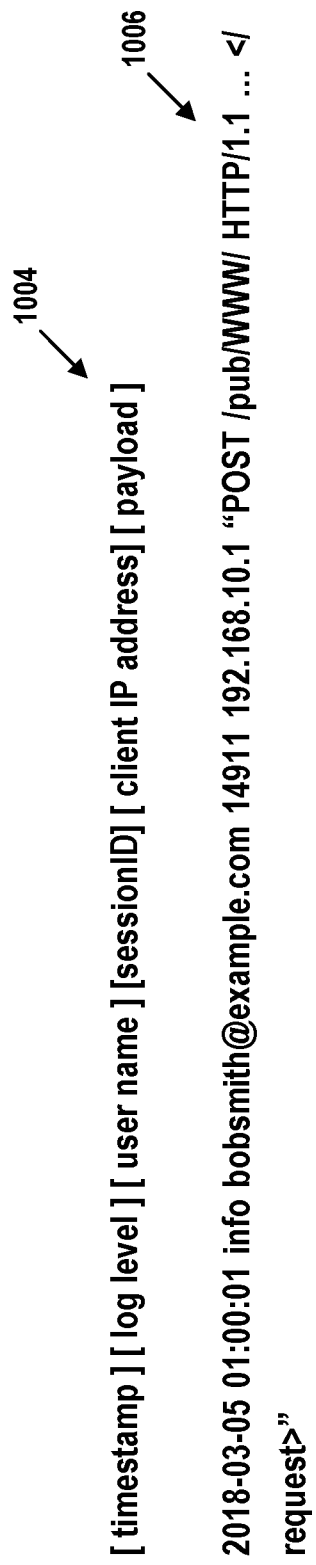
FIG. 10B depicts another file system log format and example log entry, in accordance with example embodiments.

Format 1004 of FIG. 10B shows another example log format. This format includes a timestamp of the transaction, a log level (e.g., indicating a severity of the log entry), a user name associated with the transaction, the client IP address, and a payload of the transaction.

Example log entry 1006 shows how a log entry for sample HTTP request 800 might appear according to this format. The timestamp is 2018-03-05 01:00:01, the log level of info (e.g., indicating an informational level of severity), the user name is bobsmith@example.com, the client IP address is 192.168.10.1, and the payload is "POST /pub/WWW/HTTP/ 1.1 . . . </request>". The payload may be URL-encoded.

E. Encoding Playback Commands from Low-Fidelity Traces

As described above, the main protocol of interest in the remote network management platform described herein is HTTP. For low-fidelity traces, each HTTP transaction may be represented as a 4-entry vector of HTTP-related fields: (timestamp, session identifier, user name, payload). Nonetheless, HTTP transactions may be encoded differently (such as with more or fewer fields), as may non-HTTP transactions.

These entries may be read directly from the log files, to the extent that they exist in the log files. For instance, example log entry 1002 provides a timestamp, user name, and payload, but not a session identifier, while example log entry 1006 includes all of these values. Once one or more transactions are encoded in this fashion, they may be stored (e.g., in a file) for later playback in a simulation environment.

F. De-Duplication of Encoded Transactions

As described above, simulation compiler 614 may receive both compressed traffic files from storage device 612 containing high-fidelity traces, as well as file system logs from server devices 604 containing low-fidelity traces. In some cases, these traces may contain duplicate transactions. Thus, it would be beneficial to remove these duplicate transactions from the playback commands.

In order to identify duplicate transactions, simulation compiler 614 may consider the timestamp, session identifier, and user name associated with each transaction. If any two or more transactions have the same values for all three of these parameters, then these transactions are almost certainly duplicates of one another, because the parameters uniquely identify a transaction in space and time. When a duplicate transaction is found, the high-fidelity version may be preferred over the low-fidelity version. Thus, for example, simulation compiler 614 may delete the 4-entry vector of a transaction when a 7-entry vector of that transaction already exists.

In some cases, fuzzy logic may be used with respect to the timestamps. This is because the timestamps associated with a transaction encoded in a high-fidelity trace may differ slightly from those of the same transaction encoded in a low-fidelity trace. Thus, two transactions may be considered to be duplicates if they have the same session identifier, user name, and their timestamps are within, e.g., 5 milliseconds, 10 milliseconds, or 50 milliseconds of one another.

Also, in some embodiments, other parameters may be used to identify duplicate transactions. For instance, the user name may be replaced with the client IP address. Alternatively, the user name might not be considered at all, and only the timestamp and session identifier may be considered for these purposes.

VIII. LOAD GENERATOR OPERATION

As noted above, the arrangement of FIG. 6A may be used to collect some extent (e.g., a week's worth) of traffic and transactions from a production instance. Suppose that, during this week, the production instance suffered from poor performance during a particular hour. The configuration and environment of the production instance may be created in a testing instance. The database of the testing instance may be restored from an image of the database of the production instance, and played forward to around the beginning of when the poor performance began. Then, the compressed traffic files and file system logs from this point and time may be used to create a series of transactions that can further serve as the basis for traffic to be transmitted to the testing instance. Then, the operation of the testing instance can be monitored in real time and it may be possible to determine the cause of the poor performance.

To that end, simulation controller 701 may transmit playback instructions to load generator 702 in order to cause load generator 702 to simulate the transactions represented by these playback instructions. As part of this process, simulation controller 701 may also exchange test coordination information with server devices 704 and database 706 to verify that these latter devices are ready for the simulation.

Particularly, load generator 702 may receive a playback instruction in the 7-entry format, and generate one or more packets based on these entries. The generated packets may be transmitted to server devices 704. Load generator 702 may also utilize a captured userid and password (and/or other credentials) to log in to server devices 704.

As a more detailed example, consider the encoding of Table 1. Load generator 702 may read the value of the HTTP host header (www.example.org) to determine the destination address. The simulation environment may be configured to map www.example.org to server devices 704. Then, the HTTP command, URL, HTTP headers, and HTTP body are used to reconstruct the original HTTP payload.

Load generator 702 may then initiate a transaction with one of server devices 704 (e.g., by opening a TCP connection to this server device), and transmit the reconstructed payload to the server device as part of this transaction. Thus, one or more packets may be transmitted to the server device. Once the reconstructed payload has been transmitted, load generator 702 may terminate the transaction (e.g., closing the TCP connection to the server device). In some embodiments, load generator 702 may use the HtmlUnit library to create the transaction.

IX. EXAMPLE OPERATIONS

Figure 11:
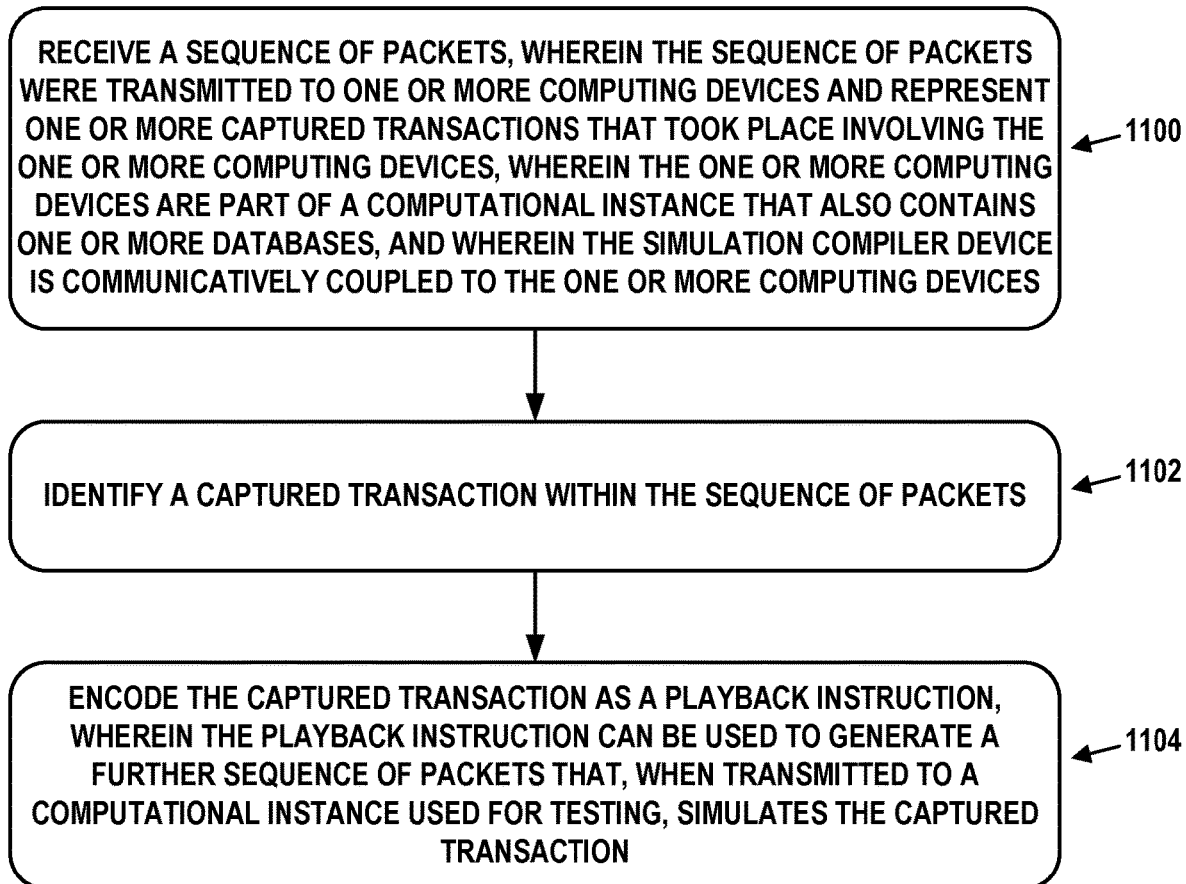
FIG. 11 is a flow chart, in accordance with example embodiments.
Figure 12:
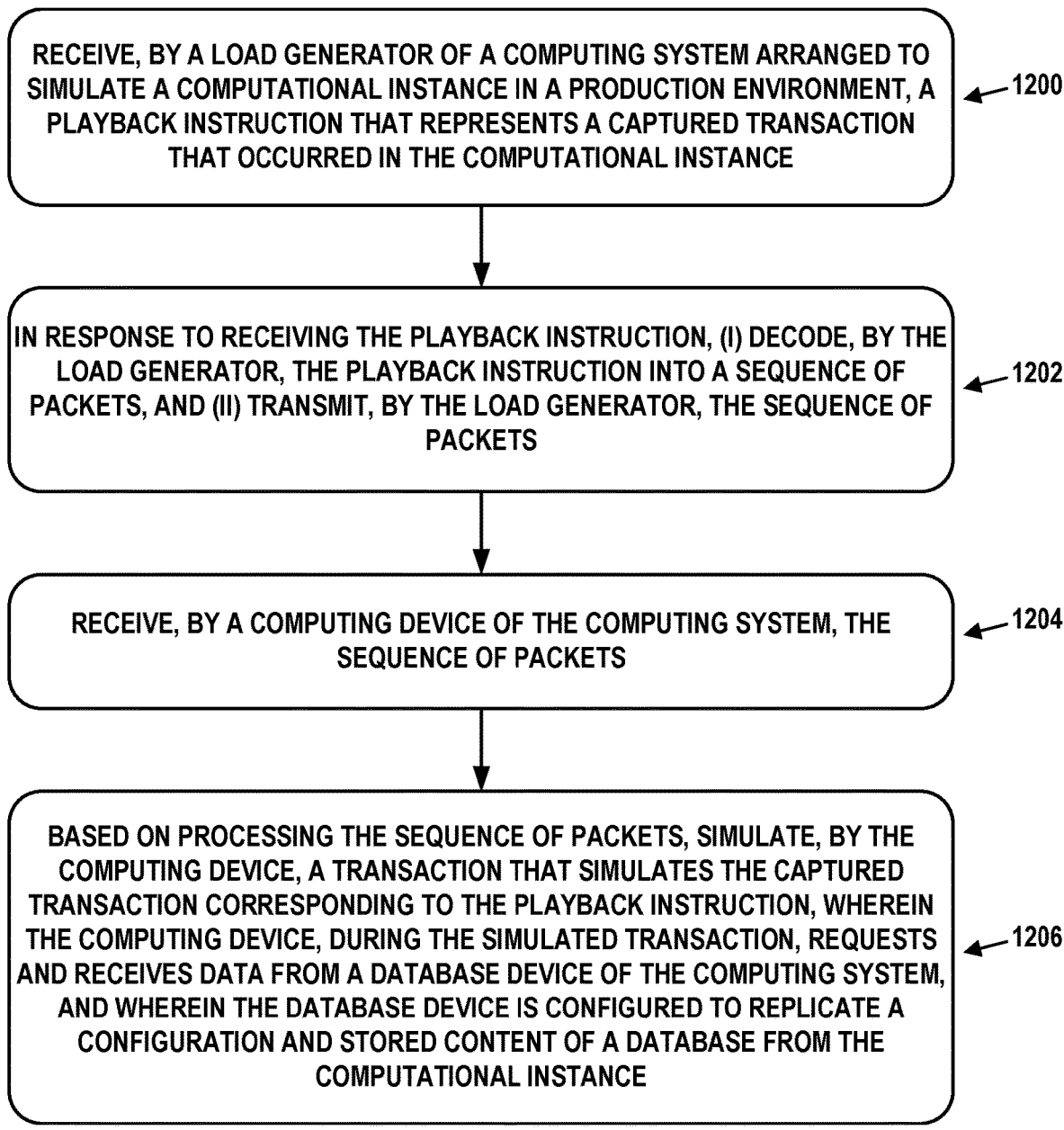
FIG. 12 is another flow chart, in accordance with example embodiments.

FIGS. 11 and 12 are flow charts illustrating example embodiments. The processes illustrated by FIGS. 11 and 12 may be carried out by a computing device, such as computing device 100, and/or a cluster of computing devices, such as server cluster 200 which embodies simulation compiler 614 and/or simulation controller 701. However, the processes can be carried out by other types of devices or device subsystems. For example, the processes could be carried out by a portable computer, such as a laptop or a tablet device.

The embodiments of FIGS. 11 and 12 may be simplified by the removal of any one or more of the features shown therein. Further, these embodiments may be combined with features, aspects, and/or implementations of any of the previous figures or otherwise described herein.

Generally speaking, FIG. 11 depicts a process for capturing transactions that occur in a production instance, and encoding these transactions in the form of playback instructions. FIG. 12 depicts a process for decoding stored playback instructions in a testing instance in order to simulate transactions. Nonetheless, aspects of these two embodiments can be combined.

Block 1100 of FIG. 11 involves receiving, by a simulation compiler device, a sequence of packets. The sequence of packets may have been transmitted to one or more computing devices and may represent one or more captured transactions that took place involving the one or more computing devices. The one or more computing devices may be part of a computational instance that also contains one or more databases. The simulation compiler device may be communicatively coupled to the one or more computing devices.

Block 1102 may involve identifying, by the simulation compiler device, a captured transaction within the sequence of packets.

Block 1104 may involve encoding, by the simulation compiler device, the captured transaction as a playback instruction. The playback instruction can be used to generate a further sequence of packets that, when transmitted to a computational instance used for testing, simulates the captured transaction.

In some embodiments, the captured transaction used TCP, and identifying the captured transaction within the sequence of packets involves: (i) scanning the sequence of packets for an initial packet of the captured transaction, where the initial packet of the captured transaction includes a TCP SYN flag that is set, (ii) determining transaction-identifying parameters from headers of the initial packet of the captured transaction, where the transaction-identifying parameters include a source IP address, a destination IP address, a source TCP port, and a destination TCP port, (iii) scanning the sequence of packets for a final packet of the captured transaction, where the final packet of the captured transaction includes a TCP FIN flag that is set and identical transaction-identifying parameters as those of the initial packet of the captured transaction, and (iv) identifying the captured transaction to include the initial packet of the captured transaction, the final packet of the captured transaction, and any packets within the sequence of packets that: (a) are temporally between the initial packet of the captured transaction and the final packet of the captured transaction, and (b) include identical transaction-identifying parameters as those of the initial packet of the captured transaction and the final packet of the captured transaction.

In some embodiments, the captured transaction is an HTTP request, and encoding the HTTP request as the playback instruction involves: (i) determining an HTTP command line from the HTTP request, (ii) determining HTTP header content from the HTTP request, where the HTTP header content follows the HTTP command line in the HTTP request, (iii) determining HTTP body content from the HTTP request, where the HTTP body content follows the HTTP headers in the HTTP request, and (iv) storing, as the playback instruction, the HTTP command line, the HTTP header content, and the HTTP body content.

In some embodiments, encoding the captured transaction as the playback instruction further involves: (i) deriving a URL from the HTTP command line and the HTTP header content, where the URL refers to a resource to which the HTTP request is addressed, and (ii) additionally storing, as part of the playback instruction, the URL. In these or other embodiments, encoding the captured transaction as the playback instruction may further involve: (i) determining a timestamp from the sequence of packets, where the timestamp represents a time during which the captured transaction took place, (ii) determining a session identifier from the sequence of packets, where the session identifier uniquely differentiates the captured transaction from other captured transactions within the sequence of packets, (iii) determining a user name from the sequence of packets, where the user name identifies an account associated with the particular computational instance, and (iv) additionally storing, as part of the playback instruction, the timestamp, the session identifier, and the user name.

In some embodiments, the computational instance is configured to store logs of captured transactions processed by the computational instance, and the simulation compiler device is further configured to: (i) receive the logs from the computational instance, (ii) remove any duplicate captured transactions from the logs and the sequence of packets, and (iii) encode the captured transactions from the logs that are not duplicate captured transactions as playback instructions. In these or other embodiments, the captured transactions from the logs and the sequence of packets may be associated with respective timestamps, session identifiers, and user names, and removing duplicate captured transactions from the logs and the sequence of packets may involve identifying a particular captured transaction from the logs as a duplicate captured transaction when the particular captured transaction is associated with a timestamp, a session identifier, and a user name that are all associated with those from any one captured transaction from the sequence of packets. Alternatively or additionally, the captured transactions from the logs are associated with respective timestamps, session identifiers, user names, and payloads, and encoding the captured transaction from the logs that is not a duplicate captured transaction involves: (i) identifying a timestamp, a session identifier, a user name, and a payload from the particular captured transaction as logged, and (ii) encoding, as an additional playback instruction, the timestamp, the session identifier, the user name, and the payload.

Turning to FIG. 12, block 1200 may involve receiving, by a load generator of a computing system arranged to simulate a computational instance in a production environment, a playback instruction that represents a captured transaction that occurred in the computational instance.

Block 1202 may involve, possibly in response to receiving the playback instruction, (i) decoding, by the load generator, the playback instruction into a sequence of packets, and (ii) transmitting, by the load generator, the sequence of packets.

Block 1204 may involve receiving, by a computing device of the computing system, the sequence of packets.

Block 1206 may involve, possibly based on processing the sequence of packets, simulating, by the computing device, a transaction that simulates the captured transaction corresponding to the playback instruction, where the computing device, during the simulated transaction, requests and receives data from a database device of the computing system, and where the database device is configured to replicate a configuration and stored content of a database from the computational instance.

In some embodiments, the playback instruction includes: a timestamp representing a time during which the captured transaction took place, a session identifier that uniquely differentiates the captured transaction from other captured transactions that took place in the computational instance, a user name that identifies an account associated with the computational instance, and a payload representing data transmitted to the computational instance as part of the captured transaction, where the database device is configured to include the account.

In these or other embodiments, decoding the playback instruction into the sequence of packets may involve reading a destination address from the payload, and distributing the payload across the sequence of packets, where the one or more load generator devices are further configured to transmit the sequence of packets to the destination address, and where the destination address is associated with the computing device. The captured transaction may have been captured in file system logs by the computational instance.

In these or other embodiments, the playback instruction may represent an HTTP request, and the payload may be further encoded to include: an HTTP command, a URL, HTTP header content, and an HTTP body all related to the HTTP request. Decoding the playback instruction into the sequence of packets may involve reading a destination address from the URL, and distributing at least some parts of the payload across the sequence of packets, where the one or more load generator devices are further configured to transmit the sequence of packets to the destination address, and where the destination address is associated with the computing device. The captured transaction may have been triggered by one or more packets captured in the computational instance. In some cases, the one or more packets were captured while incoming to the computational instance and were transmitted a source external to the computational instance.

In some embodiments, replicating the configuration and stored content of the database from the computational instance involves: (i) identifying a particular point in time to simulate, (ii) obtaining, from the computational instance, an image of the configuration and stored content of the database prior to the point in time, (iii) obtaining database logs representing database transactions that occurred between the time that the image was captured and the point in time, and (iv) installing the image on the one or more database devices and executing the database transactions from the database logs. The captured transaction may have occurred approximately at the point in time. For example, the captured transaction may have occurred within 5, 10, or 50 milliseconds of the point in time.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system, configured to operate as a remote network management platform, comprising:
   a plurality of computational instances each containing one or more computing devices and one or more databases;
   a load balancer device configured to (i) receive incoming network traffic addressed to the computational instances, and (ii) distribute the incoming network traffic to the computational instances, wherein distribution of the incoming network traffic across the one or more computing devices of each computational instance is in accordance with a load balancing algorithm;

a traffic filtering device, coupled to the load balancer device, configured to: (i) receive, as a first sequence of packets, copies of the incoming network traffic from the load balancer device, and (ii) filter the first sequence of packets to create a second sequence of packets, wherein the second sequence of packets includes only copies of packets that were transmitted to a particular computational instance of the plurality of computational instances;

a storage device, coupled to the traffic filtering device, configured to receive the second sequence of packets from the traffic filtering device and store the second sequence of packets; and a simulation compiler device, coupled to the storage device, configured to: (i) receive the second sequence of packets from the storage device, (ii) identify a first captured transaction within the second sequence of packets, (iii) receive file system logs from the particular computational instance, (iv) identify a second captured transaction within the file system logs, (v) remove one or more duplicate captured transactions between the file system logs and the second sequence of packets, wherein the one or more removed duplicate captured transactions were captured from the file system logs of the particular computational instance rather than from the second sequence of packets (vi) encode the first captured transaction as a first playback instruction, wherein the first playback instruction is used to generate a third sequence of packets that, when transmitted to a computational instance used for testing, simulates the first captured transaction, and (vii) encode the second captured transaction, as a second playback instruction, wherein the second playback instruction is used to generate a fourth sequence of packets that, when transmitted to the computational instance used for testing, simulates the second captured transaction.

2. The computing system of claim 1, wherein the first captured transaction used Transport Control Protocol (TCP), and wherein identifying the first captured transaction within the second sequence of packets comprises:

scanning the second sequence of packets for an initial packet of the first captured transaction, wherein the initial packet of the first captured transaction includes a TCP SYN flag that is set;

determining transaction-identifying parameters from headers of the initial packet of the first captured transaction, wherein the transaction-identifying parameters include a source Internet Protocol (IP) address, a destination IP address, a source TCP port, and a destination TCP port;

scanning the second sequence of packets for a final packet of the first captured transaction, wherein the final packet of the first captured transaction includes: (i) a TCP FIN flag that is set, and (ii) identical transaction-identifying parameters as those of the initial packet of the first captured transaction; and identifying the first captured transaction to include the initial packet of the first captured transaction, the final packet of the first captured transaction, and any packets within the second sequence of packets that: (i) are temporally between the initial packet of the first captured transaction and the final packet of the first captured transaction, and (ii) include identical transaction-identifying parameters as those of the initial packet of the first captured transaction and the final packet of the first captured transaction.

3. The computing system of claim 1, wherein the first captured transaction is a Hypertext Transfer Protocol (HTTP) request, and wherein encoding the HTTP request as the first playback instruction comprises:

determining an HTTP command line from the HTTP request;

determining HTTP header content from the HTTP request, wherein the HTTP header content follows the HTTP command line in the HTTP request;

determining HTTP body content from the HTTP request, wherein the HTTP body content follows the HTTP headers in the HTTP request; and storing, as the first playback instruction, the HTTP command line, the HTTP header content, and the HTTP body content.

4. The computing system of claim 3, wherein encoding the first captured transaction as the first playback instruction further comprises:

deriving a uniform resource locator (URL) from the HTTP command line and the HTTP header content, wherein the URL refers to a resource to which the HTTP request is addressed; and additionally storing, as part of the first playback instruction, the URL.

5. The computing system of claim 3, wherein encoding the first captured transaction as the first playback instruction comprises:

determining a timestamp from the second sequence of packets, wherein the timestamp represents a time during which the first captured transaction took place;

determining a session identifier from the second sequence of packets, wherein the session identifier uniquely differentiates the first captured transaction from other captured transactions within the second sequence of packets;

determining a user name from the second sequence of packets, wherein the user name identifies an account associated with the particular computational instance; and additionally storing, as part of the first playback instruction, the timestamp, the session identifier, and the user name.

6. The computing system of claim 1, wherein the first captured transaction and the second captured transaction are associated with a respective timestamp, session identifier, and user name, and wherein removing the one or more duplicate captured transactions between the file system logs and the second sequence of packets comprises:

identifying a particular captured transaction from the file system logs as a duplicate captured transaction when the particular captured transaction is associated with a timestamp, a session identifier, and a user name that are all associated with those from any one captured transaction from the second sequence of packets.

7. The computing system of claim 1, wherein the second captured transaction is associated with a timestamp, a session identifier, a user name, and a payload, and wherein encoding the second captured transaction that is not a duplicate captured transaction comprises:

identifying the timestamp, the session identifier, the user name, and the payload from the second captured transaction as logged; and encoding, as the second playback instruction, the timestamp, the session identifier, the user name, and the payload.

8. The computing system of claim 1, wherein the storage device and the traffic filtering device are a common physical device.

9. The computing system of claim 1, wherein the storage device and the simulation compiler device are a common physical device.

10. A method comprising:
receiving, by a simulation compiler device, a first sequence of packets, wherein the first sequence of packets was transmitted to one or more computing devices and represent one or more captured transactions that took place involving the one or more computing devices, wherein the one or more computing devices are part of a computational instance that also contains one or more databases, and wherein the simulation compiler device is communicatively coupled to the one or more computing devices;
identifying, by the simulation compiler device, a first captured transaction within the first sequence of packets;
receiving, by the simulation compiler device, file system logs from the computational instance, wherein the file system logs represent a second captured transaction;
removing, by the simulation compiler device, one or more duplicate captured transactions between the file system logs and the first sequence of packets, wherein the one or more removed duplicate captured transactions were captured from the file system logs of the computational instance rather than from the first sequence of packets;
encoding, by the simulation compiler device, the first captured transaction as a first playback instruction, wherein the first playback instruction is used to generate a second sequence of packets that, when transmitted to a computational instance used for testing, simulates the first captured transaction; and
encoding, by the simulation compiler device, the second captured transaction from the file system logs as a second playback instruction, wherein the second playback instruction is used to generate a third sequence of packets that, when transmitted to the computational instance used for testing, simulates the second captured transaction.

11. The method of claim 10, wherein the first captured transaction used Transport Control Protocol (TCP), and wherein identifying the first captured transaction within the first sequence of packets comprises:
scanning the first sequence of packets for an initial packet of the first captured transaction, wherein the initial packet of the first captured transaction includes a TCP SYN flag that is set;
determining transaction-identifying parameters from headers of the initial packet of the first captured transaction, wherein the transaction-identifying parameters include a source Internet Protocol (IP) address, a destination IP address, a source TCP port, and a destination TCP port;
scanning the first sequence of packets for a final packet of the first captured transaction, wherein the final packet of the first captured transaction includes: (i) a TCP FIN flag that is set, and (ii) identical transaction-identifying parameters as those of the initial packet of the first captured transaction; and
identifying the first captured transaction to include the initial packet of the first captured transaction, the final packet of the first captured transaction, and any packets within the first sequence of packets that: (i) are temporally between the initial packet of the first captured transaction and the final packet of the first captured transaction, and (ii) include identical transaction-identifying parameters as those of the initial packet of the first captured transaction and the final packet of the first captured transaction.

12. The method of claim 10, wherein the first captured transaction is a Hypertext Transfer Protocol (HTTP) request, and wherein encoding the HTTP request as the first playback instruction comprises:
determining an HTTP command line from the HTTP request;
determining HTTP header content from the HTTP request, wherein the HTTP header content follows the HTTP command line in the HTTP request;
determining HTTP body content from the HTTP request, wherein the HTTP body content follows the HTTP headers in the HTTP request; and
storing, as the first playback instruction, the HTTP command line, the HTTP header content, and the HTTP body content.

13. The method of claim 12, wherein encoding the first captured transaction as the first playback instruction comprises:
deriving a uniform resource locator (URL) from the HTTP command line and the HTTP header content, wherein the URL refers to a resource to which the HTTP request is addressed; and
additionally storing, as part of the first playback instruction, the URL.

14. The method of claim 10, wherein encoding the first captured transaction as the first playback instruction comprises:
determining a timestamp from the first sequence of packets, wherein the timestamp represents a time during which the first captured transaction took place;
determining a session identifier from the first sequence of packets, wherein the session identifier uniquely differentiates the first captured transaction from other captured transactions within the first sequence of packets;
determining a user name from the first sequence of packets, wherein the user name identifies an account associated with the computational instance; and
additionally storing, as part of the first playback instruction, the timestamp, the session identifier, and the user name.

15. The method of claim 10, wherein the first captured transaction and the second captured transaction are associated with a respective timestamp, session identifier, and user name, and wherein removing the one or more duplicate captured transactions between the file system logs and the first sequence of packets comprises:
identifying a particular captured transaction from the file system logs as a duplicate captured transaction when the particular captured transaction is associated with a timestamp, a session identifier, and a user name that are all associated with those from any one captured transaction from the first sequence of packets.

16. The method of claim 10, wherein the second captured transaction is associated with a timestamp, a session identifier, a user name, and a payload, and wherein encoding the second captured transaction from the file system logs that is not a duplicate captured transaction comprises:

identifying the timestamp, the session identifier, the user name, and the payload from the second captured transaction as logged; and encoding, as the second playback instruction, the timestamp, the session identifier, the user name, and the payload.

17. An article of manufacture including a non-transitory computer-readable medium, having stored thereon program instructions that, upon execution by a computing system, cause the computing system to perform operations comprising:

receiving a first sequence of packets, wherein the first sequence of packets was transmitted to one or more computing devices and represent one or more captured transactions that took place involving the one or more computing devices, wherein the one or more computing devices are part of a computational instance that also contains one or more databases, and wherein a simulation compiler device is communicatively coupled to the one or more computing devices;

receiving file system logs from one or more computing devices that are part of the computational instance that also contains one or more databases;

identifying a first captured transaction within the first sequence of packets;

identifying a second captured transaction within the file system logs;

removing one or more duplicate captured transactions between the file system logs and the first sequence of packets, wherein the one or more removed duplicate captured transactions were captured from the file system logs of the computational instance rather than from the first sequence of packets;

encoding the first captured transaction as a first playback instruction, wherein the first playback instruction is used to generate a second sequence of packets that, when transmitted to a computational instance used for testing, simulates the first captured transaction; and encoding the second captured transaction as a second playback instruction, wherein the second playback instruction is used to generate a third sequence of packets that, when transmitted to the computational instance used for testing, simulates the second captured transaction.

18. The article of manufacture of claim 17, wherein the first captured transaction is a Hypertext Transfer Protocol (HTTP) request, and wherein encoding the HTTP request as the first playback instruction comprises:

determining an HTTP command line from the HTTP request;

determining HTTP header content from the HTTP request, wherein the HTTP header content follows the HTTP command line in the HTTP request;

determining HTTP body content from the HTTP request, wherein the HTTP body content follows the HTTP headers in the HTTP request; and storing, as the first playback instruction, the HTTP command line, the HTTP header content, and the HTTP body content.

\* \* \* \* \*